United States Patent
Wang et al.

(10) Patent No.: US 8,348,525 B2
(45) Date of Patent: Jan. 8, 2013

(54) MODULAR CONNECTOR SYSTEM HAVING ELECTRICAL AND OPTICAL LINKS

(75) Inventors: Tak Kui Wang, Cupertino, CA (US); Chung-Yi Su, Fremont, CA (US); Bing Shao, Sunnyvale, CA (US)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 337 days.

(21) Appl. No.: 12/821,001

(22) Filed: Jun. 22, 2010

(65) Prior Publication Data

US 2011/0311188 A1    Dec. 22, 2011

(51) Int. Cl.
*G02B 6/36* (2006.01)
(52) U.S. Cl. .................. 385/93; 385/88; 385/92
(58) Field of Classification Search ............... 385/88–94
See application file for complete search history.

(56) References Cited

U.S. PATENT DOCUMENTS

| | | | |
|---|---|---|---|
| 7,347,632 | B2 | 3/2008 | Farr |
| 7,537,489 | B2 | 5/2009 | Iranpour Feridani et al. |
| 2009/0088024 | A1 | 4/2009 | Ling et al. |
| 2010/0046891 | A1 | 2/2010 | Sabo |

FOREIGN PATENT DOCUMENTS

WO    2008121731 A1    10/2008

*Primary Examiner* — Uyen Chau N Le
*Assistant Examiner* — Michael Mooney (57) ABSTRACT

An opto-electronic module connector system is mountable on a system substrate, such as a printed circuit board, in a variety of configurations or orientations and includes an electromagnetic interference (EMI)-shielding enclosure, a connector assembly, and a socket. The connector assembly includes a connector body, a connector printed circuit board, a substantially planar contact holder, electrical contact fingers mounted on the contact holder, and an opto-electronic module. When the EMI-shielding enclosure and socket are mounted on the system substrate, a user can readily insert the connector assembly into the EMI-shielding enclosure and plug it into the socket. A user can likewise readily remove the connector assembly from the EMI-shielding enclosure and socket for maintenance, cleaning, repair or other purposes.

20 Claims, 10 Drawing Sheets

MODULAR CONNECTOR SYSTEM HAVING ELECTRICAL AND OPTICAL LINKS

BACKGROUND

In an optical communication system, it is generally necessary to couple an optical fiber to an opto-electronic transmitter, receiver or transceiver device and, in turn, to couple the device to an electronic system such as a switching system or processing system. These connections can be facilitated by modularizing the transceiver device. An opto-electronic transceiver module includes an opto-electronic light source, such as a laser, and an opto-electronic light receiver, such as a photodiode, and may also include various electronic circuitry associated with the laser and photodiode. For example, driver circuitry can be included for driving the laser in response to electronic signals received from the electronic system. Likewise, receiver circuitry can be included for processing the signals produced by the photodiode and providing output signals to the electronic system. The electronic and opto-electronic devices can be mounted on a small circuit board or similar substrate inside the transceiver module housing. The circuit board can include an electrical connector for connecting the opto-electronic transceiver to the external electronic system. The housing or enclosure in which the circuit board, laser, photodiode, driver and receiver circuitry, etc., are contained is commonly made of metal to shield these elements against electromagnetic interference (EMI).

In some modular opto-electronic transceiver systems, an optical plug that terminates an optical fiber cable can be plugged into a socket in the transceiver module housing. When coupled to the transceiver module in this manner, the ends of optical fibers in the plug are optically aligned with optics in the opto-electronic transceiver. The optics couple optical signals between the fibers and the laser and photodiode. A first fiber, which can be referred to as a transmit fiber, is optically coupled to the laser so that optical signals generated by the transceiver module are transmitted via that transmit fiber. A second fiber, which can be referred to as a receive fiber, is optically coupled to the photodiode so that optical signals received via the receive fiber can be received by the transceiver module.

In some opto-electronic transceiver modules, the optical signal path includes a 90-degree turn. For example, the above-described circuit board on which the laser and photodiode are mounted can be oriented perpendicularly or normal to the axes along which the signals are communicated with the optical fibers in the plug. The laser emits the optical transmit signal in a direction normal to the circuit board, and the photodiode receives the optical receive signal from a direction normal to the circuit board. The above-referenced optics in the transceiver module can include a first lens that collimates the optical transmit signal emitted by the laser and a second lens that focuses the optical receive signal upon the photodiode. A mirror or reflector in the transceiver module that is oriented at a 45-degree angle with respect to the circuit board can redirect the optical signals emitted by the laser and received by the photodiode.

A user, such as a manufacturer of the above-mentioned switching system, processing system, or other electronic system that includes optical communication links, commonly uses an opto-electronic transceiver module or similar part by soldering the part to a printed circuit board (either directly or by soldering an intermediate coupling connector to the printed circuit board) as a step of a manufacturing process for an electronic circuit assembly. The user can select from among various commercially available opto-electronic transceiver modules having different configurations (i.e., different models or part numbers), such as a configuration in which a mating optical fiber plug can be plugged into the transceiver module from a direction parallel to the plane of the printed circuit board at an edge of the printed circuit board or a configuration in which a mating optical fiber plug can be plugged into the transceiver module from a direction perpendicular or normal to the plane of the printed circuit board. Each of the different transceiver module configurations is commonly assembled from a different set of constituent parts or elements. The need for a manufacturer of transceiver modules to produce a number of different transceiver modules having different configurations (i.e., different models or part numbers) from an accordingly significant number of different constituent parts can impact manufacturing economy. Also, as some types of transceiver modules are commonly mounted to a system circuit board by soldering or similar relatively permanent methods, in such instances the transceiver module is not readily removable for maintenance or replacement. Furthermore, reflow soldering methods can potentially harm heat-sensitive transceiver module elements.

Connector systems have been suggested that include both an optical signal path and an electrical signal path. When the plug connector of such a system is plugged into the socket or receptacle connector of such a system, optical signals can be communicated in parallel with electrical signals between the plug and socket connectors. It has been suggested to provide such a connector system in a configuration similar to a Universal Serial Bus (USB) configuration. The buildup of dust or other contaminants on the optical elements in such a system may be problematic.

SUMMARY

Embodiments of the present invention relate to an opto-electronic module connector system that is mountable on a system substrate, such as a printed circuit board, in any of a variety of configurations or orientations. In an exemplary embodiment, the opto-electronic module connector system comprises a connector assembly, a socket, and an electromagnetic interference (EMI)-shielding enclosure. The connector assembly includes a connector body, a contact holder attached to the connector body, a plurality of electrical contact fingers mounted on the contact holder, and an opto-electronic module. The opto-electronic module includes a connector printed circuit board and at least one opto-electronic device electrically coupled to one or more circuit paths of the connector printed circuit board. The connector printed circuit board includes a first electrical contact array comprising first electrical contact pads, and a second electrical contact array comprising second electrical contact pads. The first electrical contact array communicates signals with the electrical contact fingers.

The socket and EMI-shielding enclosure can be mounted on the system printed circuit board or other substrate in any of a variety of configurations or orientations. The connector assembly can be inserted into an opening at an end of the EMI-shielding enclosure. As the connector assembly is further inserted, the end of the printed circuit board having the second electrical contact array plugs into the socket.

As the connector assembly is a separate part from the EMI-shielding enclosure and socket in the exemplary embodiment, the connector assembly can be unplugged from the socket and removed from the EMI-shielding enclosure to, for example, perform cleaning or other maintenance upon the connector assembly, or to replace a failing connector assembly, without removing the socket and EMI-shielding enclosure from the system printed circuit board. The opto-electronic module connector system can be provided in the form of a kit, in which the combination of the EMI-shielding enclosure and socket defines a first connector kit portion, and the connector assembly defines a second connector kit portion. As the connector assembly need not be plugged into the socket until after the socket has been mounted on the system printed circuit board, reflow soldering or other manufacturing steps performed upon the EMI-shielding enclosure and socket pose no risk of harm to the connector assembly.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
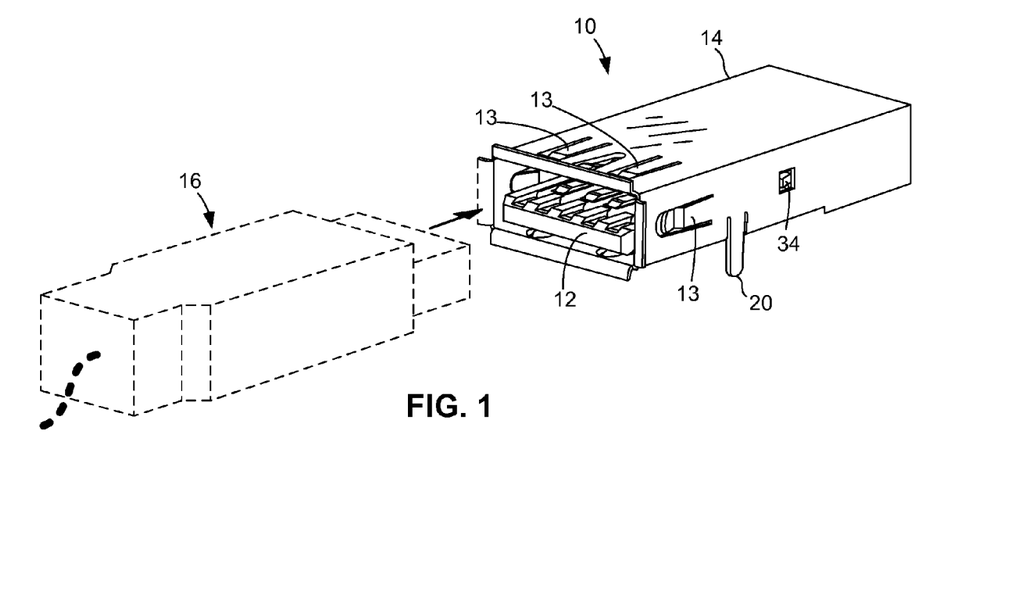
FIG. 1 is a perspective view of an opto-electronic module connector system, in accordance with an exemplary embodiment of the invention.

As illustrated in FIG. 1, in an illustrative or exemplary embodiment of the invention, an opto-electronic module connector system 10 includes a connector assembly 12 within a rectangular or box-like electromagnetic interference (EMI)-shielding enclosure 14. EMI-shielding enclosure 14 can be made of, for example, formed sheet metal. The distal end of EMI-shielding enclosure 14 is open and exposes the distal end of connector assembly 12. A plug-like mating connector 16 can be connected to opto-electronic module connector system 10. Tab-like resilient portions 13 of EMI-shielding enclosure 14 aid retention of mating connector 16. The opening in the distal end of EMI-shielding enclosure 14, resilient portions 13, and other elements of opto-electronic module connector system 10 that frictionally contact or otherwise engage or contact elements of mating connector 16 together define a pluggable connector interface, i.e., an interface to which mating connector 16 can be connected in a plug-like manner.

When mating connector 16 is connected to opto-electronic module connector system 10, both optical signals and electrical signals can be communicated between mating connector 16 and opto-electronic module connector system 10.

Figure 2:
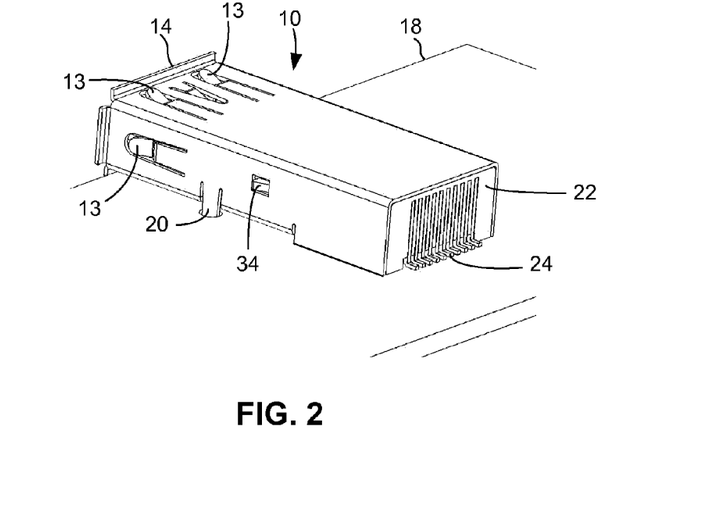
FIG. 2 is a perspective view of the opto-electronic module connector system of FIG. 1 mounted on a circuit board.

As illustrated in FIG. 2, opto-electronic module connector system 10 can be mounted on a system printed circuit board 18 or similar substrate. Mounting legs 20 on EMI-shielding enclosure 14 facilitate this mounting, as they can be soldered into grounded through-holes in system printed circuit board 18.

Enclosed in the proximal end of EMI-shielding enclosure 14 is a socket assembly 21 comprising a socket 22 and EMI-shielding enclosure 14. Socket assembly 21 is mounted on system printed circuit board 18 by soldering (e.g., surface mounting) the electrical leads 24 of socket 22 to pads (not shown for purposes of clarity) on the surface of system printed circuit board 18.

Figure 3:
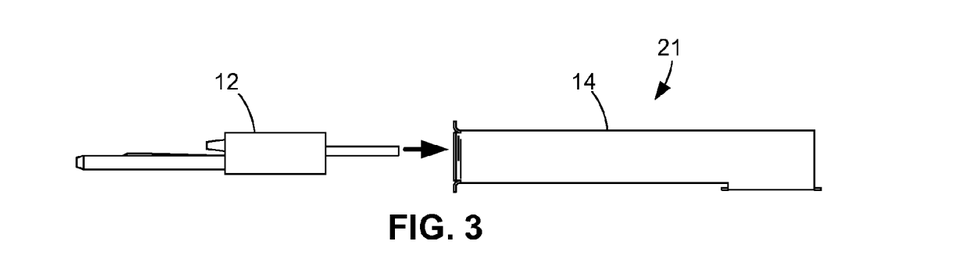
FIG. 3 is a side elevation view illustrating insertion of the connector assembly of the opto-electronic module connector system of FIG. 1 into the EMI-shielding enclosure.
Figure 4:
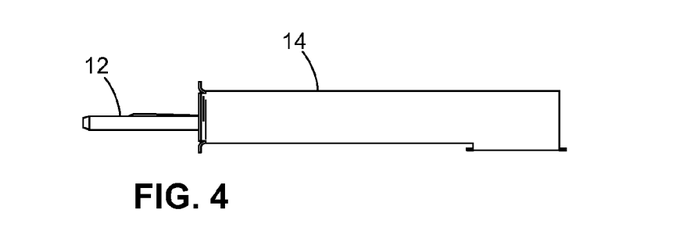
FIG. 4 is similar to FIG. 3, showing the connector assembly of FIG. 3 further inserted into the EMI-shielding enclosure.
Figure 5:
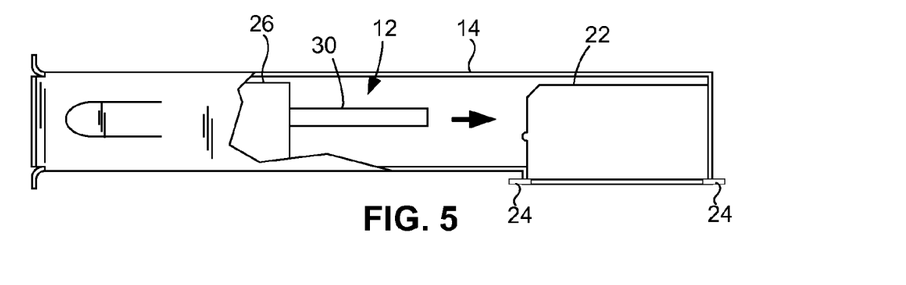
FIG. 5 is similar to FIGS. 3-4, showing the connector assembly still further inserted into the EMI-shielding enclosure, partially cut away to show the socket inside the EMI-shielding enclosure.
Figure 6:
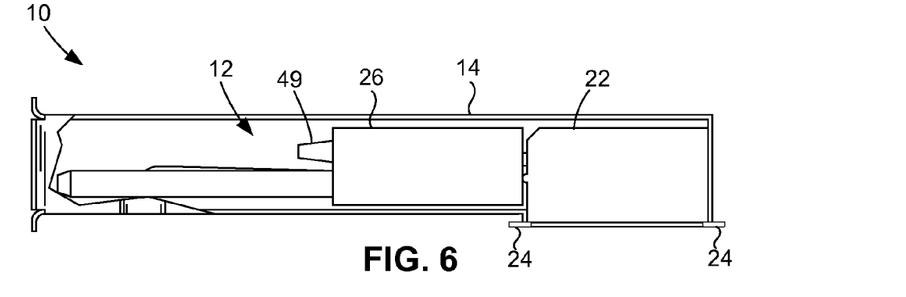
FIG. 6 is similar to FIG. 5, showing the connector assembly fully inserted into the EMI-shielding enclosure, with the proximal end the connector assembly mated with the socket.

As illustrated in FIGS. 3-5, the proximal end of connector assembly 12 can be inserted into the open (distal) end of EMI-shielding enclosure 14 and pushed further into EMI-shielding enclosure 14 toward the proximal end of EMI-shielding enclosure 14. Connector assembly 12 can be inserted into socket assembly 21 in this manner until the proximal end of connector assembly 12 mates with socket 22, as shown in FIG. 6. Note that as socket assembly 21 can be mounted on system printed circuit board 18 before connector assembly 12 is inserted into it, reflow soldering or other manufacturing procedures can be performed on socket assembly 21 without risk of harming connector assembly 12. Opto-electronic module connector system 10 can be provided or used in the form of a kit, where socket assembly 21 defines a first connector kit portion, and connector assembly 12 defines a second connector kit portion.

Figure 7:
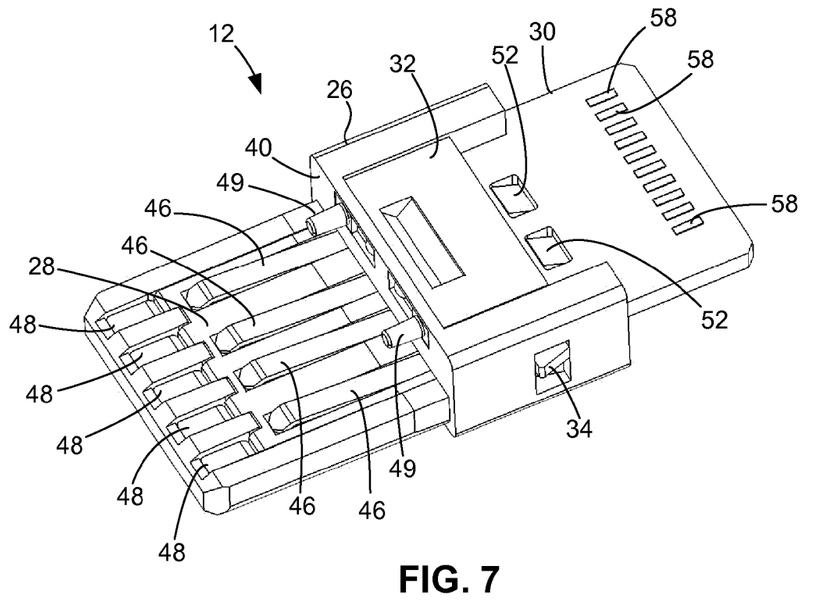
FIG. 7 is a perspective view of the connector assembly of the connector assembly of FIGS. 3-6, showing the top portions of the connector assembly.
Figure 8:
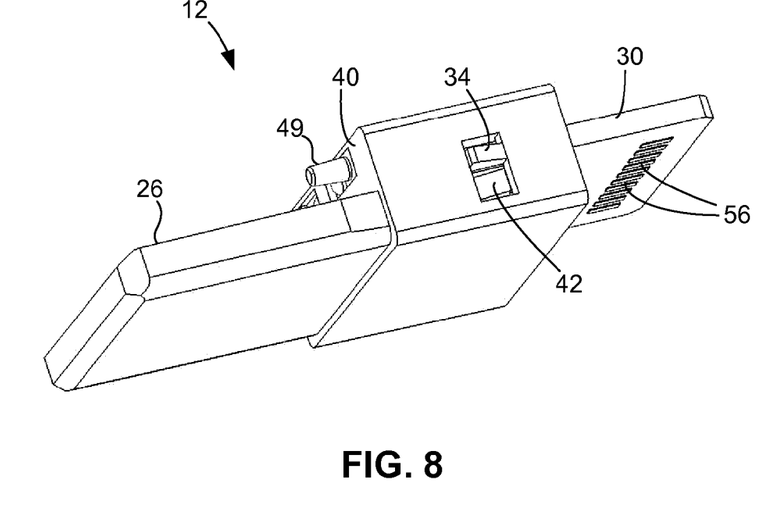
FIG. 8 is similar to FIG. 7, showing the bottom portions of the connector assembly.

As illustrated in FIGS. 7-8, connector assembly 12 includes a connector body 26, a substantially planar or tongue-like contact holder 28, and a printed circuit board 30. An opto-electronic module 32, which includes printed circuit board 30, is described below in further detail. Connector body 26 has ears 34 that snap into corresponding openings in EMI-shielding enclosure 14 (FIGS. 1-2) when connector assembly 12 is inserted into EMI-shielding enclosure 14 in the manner described above.

Figure 9:
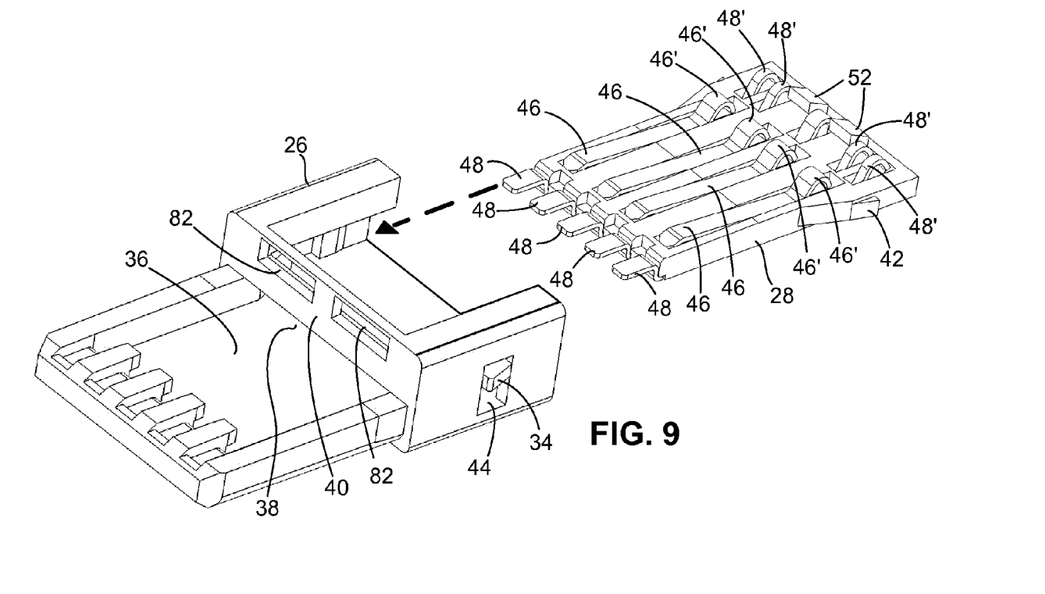
FIG. 9 is an assembly view of the connector body and contact holder portions of the connector assembly of FIGS. 7-8.
Figure 10:
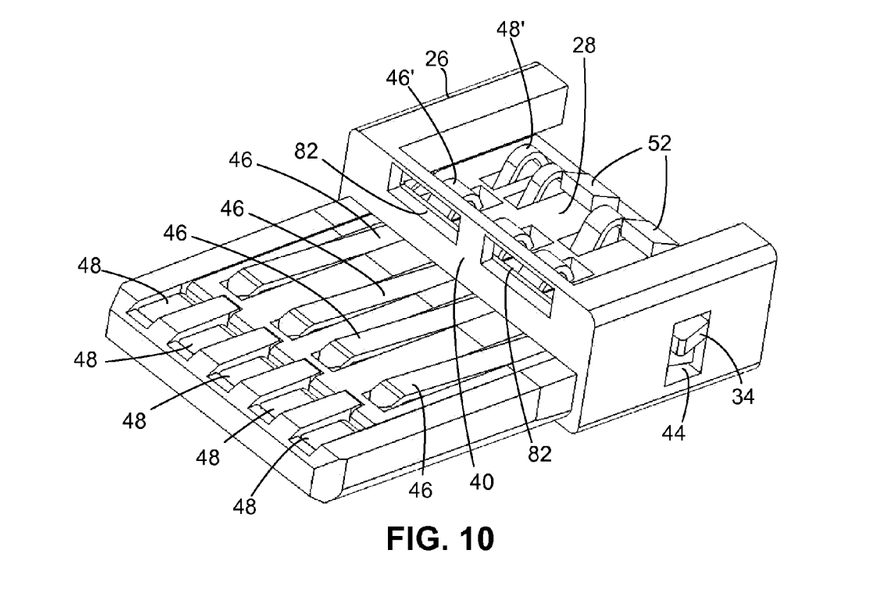
FIG. 10 is similar to FIG. 9, showing the contact holder assembled to the connector body.

As illustrated in FIGS. 9-10, contact holder 28 can be mounted in a tray-like or recessed area 36 in connector body 26 by sliding the distal end of contact holder 28 through a slot 38 at the base of a front wall 40 of connector body 26.

Contact holder 28 has ears 42 that snap into openings 44 in connector body 26 (FIGS. 9-10) to facilitate assembly of connector assembly 26. A plurality of elongated or finger-like electrical contacts (or electrical contact fingers) 46 and 48 are mounted on contact holder 28. Opto-electronic module connector system 10 has a configuration similar to that known as the Universal Serial Bus (USB). In the exemplary embodiment, the five electrical contact fingers 48 are arranged in a parallel array of a size and configuration compatible with the USB 3.0 connector standard. Similarly, the four electrical contact fingers 46 are arranged in a parallel array of a size and configuration compatible with the USB 2.0 connector standard. Thus, in the exemplary embodiment opto-electronic module connector system 10 is intended to be compatible with aspects of both the USB 2.0 and 3.0 standards. In other embodiments, an opto-electronic module connector system in accordance with the present invention can have electrical contacts arrayed or otherwise arranged in any other suitable manner to comport with any other standard or desired configuration.

It should be noted that the use of the term "mounted on" to describe the location or position of electrical contact fingers 46 and 48 with respect to contact holder 28 is used for purposes of convenience, as portions of electrical contact fingers 46 and 48 may be perceived as located either "on" or "in" contact holder 28. Note in FIG. 10 that portions of electrical contact fingers 46 and 48 are recessed within contact holder 28 to retain them, while other portions may be flush with a surface or extend above a surface of contact holder 28. The use herein of the term "in" with regard to the relationship between two elements in the exemplary embodiment is intended to include the term "on" within its scope of meaning, unless stated or clearly indicated otherwise. Conversely, the use herein of the term "on" with regard to the relationship between two elements in the exemplary embodiment is intended to include the term "in" within its scope of meaning, unless stated or clearly indicated otherwise.

Although various types of USB connectors having various configurations are known, a USB connector system is generally characterized by an elongated, shielded plug connector that plugs into a shielded receptacle connector having a parallel array of elongated or finger-like electrical contacts held in a substantially planar or tongue-like contact holder, where a similar tongue-shaped contact holder that is enclosed within the shield of the plug connector slides into a mated position against the electrical contact holder of the receptacle connector. To the extent that the term "USB," "USB-like" or a similar term may be used herein, the term is intended to refer to such a structure or configuration.

Other connector assemblies having both an opto-electronic transceiver module and electrical USB connections are described in co-pending U.S. patent application Ser. No. 12/628,163, filed Nov. 30, 2009, entitled "UNIVERSAL SERIAL BUS (USB) CONNECTOR HAVING AN OPTICAL-TO-ELECTRICAL/ELECTRICAL-TO-OPTICAL CONVERSION MODULE (OE MODULE) AND A HIGH-SPEED ELECTRICAL CONNECTION INTEGRATED THEREIN," the disclosure of which is incorporated herein by this reference.

Although not shown for purposes of clarity, when mating connector 16 (FIG. 1) is plugged into opto-electronic module connector system 10, corresponding electrical contact fingers (not shown) in mating connector 16 slide into contact with the distal ends of electrical contact fingers 46 and 48. As also characteristic of USB-like connectors, electrical contact fingers 46 are somewhat resiliently deflectable to provide a frictional contact force against corresponding electrical contact fingers in mating connector 16 and thus promote good electrical contact. Frictional contact between electrical contact fingers 46 and 48 and corresponding electrical contact fingers in mating connector 16 and between portions of contact holder 28 and similar portions of mating connector 16 also contributes to the pluggable characteristic of the connector interface. In addition, opto-electronic module connector system 10 has two alignment protuberances 49 (FIGS. 6-8) that fit within corresponding bores or openings (not shown) in mating connector 16, also contributing to the pluggable characteristic of the connector interface. Also, when mating connector 16 is mated with opto-electronic module connector system 10, front wall 40 (FIGS. 7-10) can serve in the connector interface as a stop by abutting a forward or distal portion of mating connector 16. Front wall 40 also serves as a dust cover, blocking dust or similar contaminants from entering.

Figure 11:
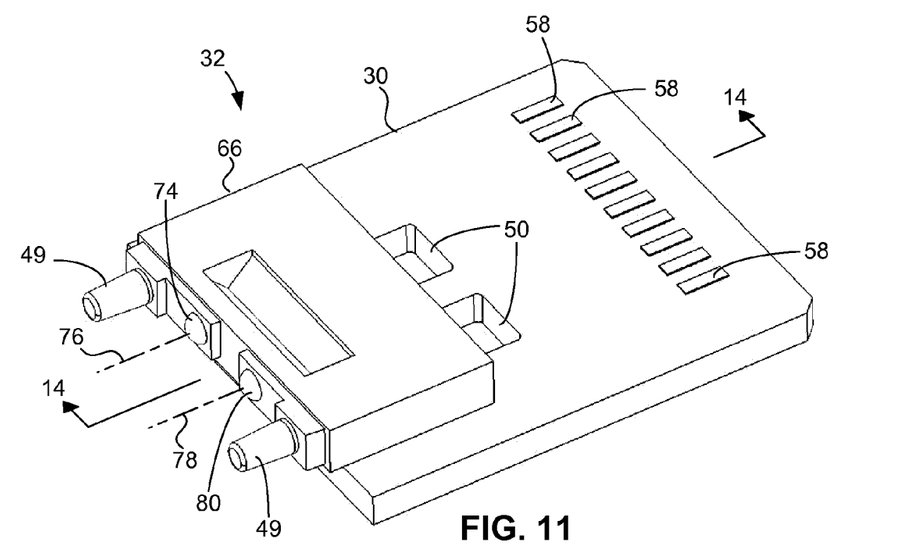
FIG. 11 is a perspective view of a portion of the connector assembly of FIGS. 7-8, showing the printed circuit board and opto-electronic module mounted thereon.
Figure 12:
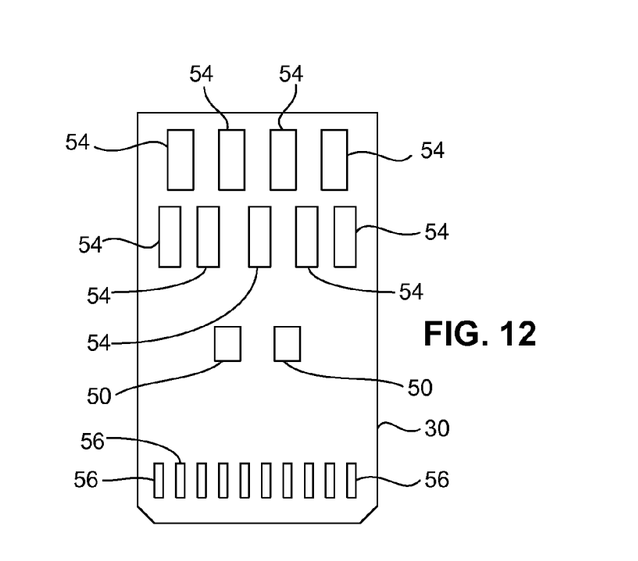
FIG. 12 is a bottom plan view of the printed circuit board of the connector assembly of FIGS. 7-8.

As illustrated in FIG. 11, printed circuit board 30 has two openings 50 that engage two corresponding wedge-shaped protuberances 52 on contact holder 28 when printed circuit board 30 and contact holder 28 are assembled into connector assembly 12 (FIG. 7). As illustrated in FIG. 12, the bottom of printed circuit board 30 has a plurality of forward contact pads 54 arranged in a pattern corresponding to that in which the proximal ends of electrical contact fingers 46 and 48 are arranged (FIGS. 9-10). When printed circuit board 30, contact holder 28 and connector body 26 are assembled into connector assembly 12 (FIGS. 7-8), the proximal ends 46' and 48' of electrical contact fingers 46 and 48, respectively, contact forward contact pads 54. As shown in FIGS. 9-10, the proximal ends 46' and 48' are bowed upwardly to provide a somewhat resilient, frictional contact force against forward contact pads 54, thereby promoting good electrical contact. The bottom and top surfaces of printed circuit board 30 have rearward contact pads 56 and 58, respectively, at the rearward or proximal end of printed circuit board 30. When the proximal end of connector assembly 12 is inserted in socket 22, rearward contact pads 56 and 58 mate with conductors in socket 22 that are coextensive with electrical leads 24 (FIG. 6). Note that the proximal end of connector assembly 12 comprises the proximal or rearward end of printed circuit board 30.

Figure 13:
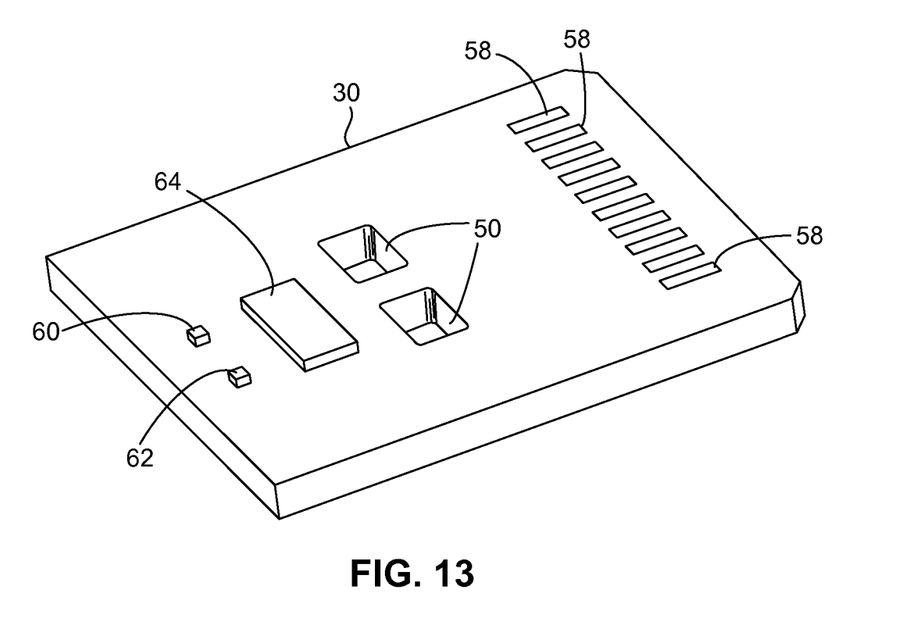
FIG. 13 is a perspective view of the printed circuit board of the connector assembly of FIGS. 7-8, showing the top portions of the printed circuit board.
Figure 14:
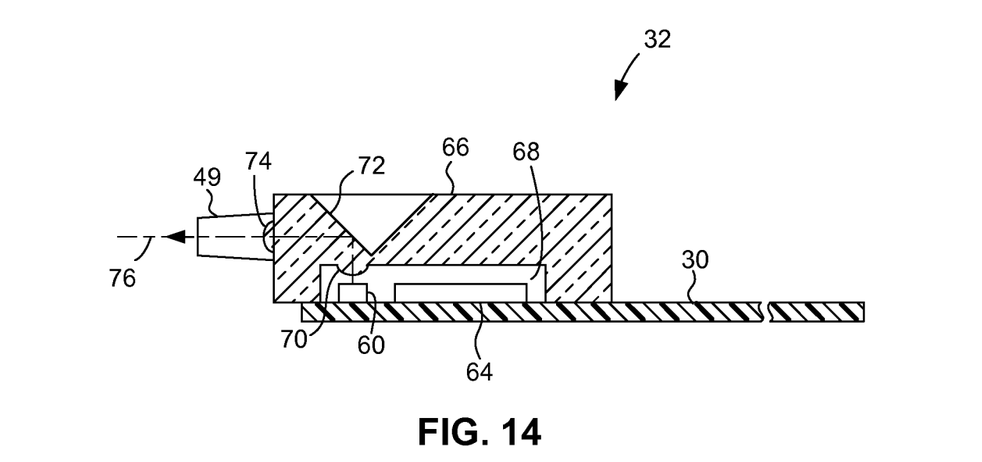
FIG. 14 is a sectional view taken on line 14-14 of FIG. 11.

As illustrated in FIGS. 13-14, a light source 60, such as a laser, a light receiver 62, such as a photodiode, and an integrated circuit chip 64 that can include driver and receiver circuitry, are all mounted on printed circuit board 30. Opto-electronic module 32 comprises printed circuit board 30, light source 60, light receiver 62 and integrated circuit chip 64, as well as an optical body 66 that is mounted on printed circuit board 30 over light source 60, light receiver 62 and integrated circuit chip 64 at the forward or distal end of printed circuit board 30. A void or recess 68 in optical body 66 accommodates light source 60, light receiver 62 and integrated circuit chip 64. Optical body 66 can be made of a moldable optical thermoplastic, such as, for example, ULTEM® polyetherimide from SABIC (formerly General Electric Plastics Division). Alignment protuberances 49 can be molded in optical body 66.

In the illustrated opto-electronic module 32, light emitted by opto-electronic light source 60 (FIG. 13) passes through a first lens 70, is reflected at a 90-degree angle by a mirrored or reflective surface 72 in optical body 66, passes through a second lens 74, and is emitted from opto-electronic module 32 along a transmit signal axis 76. Similarly, light received along a receive signal axis 78 (FIG. 11) passes through a third lens 80, is reflected at a 90-degree angle by reflective surface 72, passes through a fourth lens (not shown), and impinges upon opto-electronic light receiver 62 (FIG. 13). First lens 70 controls the beam spot size of the light at second lens 74, and the fourth lens (not shown) performs the same function with respect to the beam spot size of the light at third lens 80. Stated another way, first lens 70 and second lens 74 in combination define a collimating lens. Neither first lens 70 nor second lens 74 is a focusing lens.

Circuit paths or traces in printed circuit board 30 couple electrical signals among integrated circuit device 64, opto-electronic light source 60, opto-electronic light receiver 62, forward contact pads 54, and rearward contact pads 56 and 58. Although in the exemplary embodiment reflective surface 72 provides an optical turn in signal direction, in other embodiments other structures that provide an analogous electrical turn can be provided, as described in co-pending U.S. patent application Ser. No. 12/758,085, filed Apr. 12, 2010, entitled "OPTO-ELECTRONIC TRANSCEIVER MODULE WITH CASTELLATED ELECTRICAL TURN."

The paths and optics in opto-electronic module connector system 10 through which optical signals are transmitted and received along transmit signal axis 76 and receive signal axis 78, respectively, define an optical interface. This optical interface optically couples opto-electronic module 32 with the connector interface, such that when mating connector 16 (FIG. 1) is plugged into opto-electronic module connector system 10 both optical signals and electrical signals can be communicated between opto-electronic module connector system 10 and mating connector 16.

Note that when printed circuit board 30, contact holder 28 and connector body 26 are assembled into connector assembly 12 (FIGS. 7-8), portions of optical body 66 that include lenses 74 and 80 and alignment protuberances 49 extend through respective openings 82 (FIGS. 9-10) in front wall 40 of connector body 26.

Figure 15:
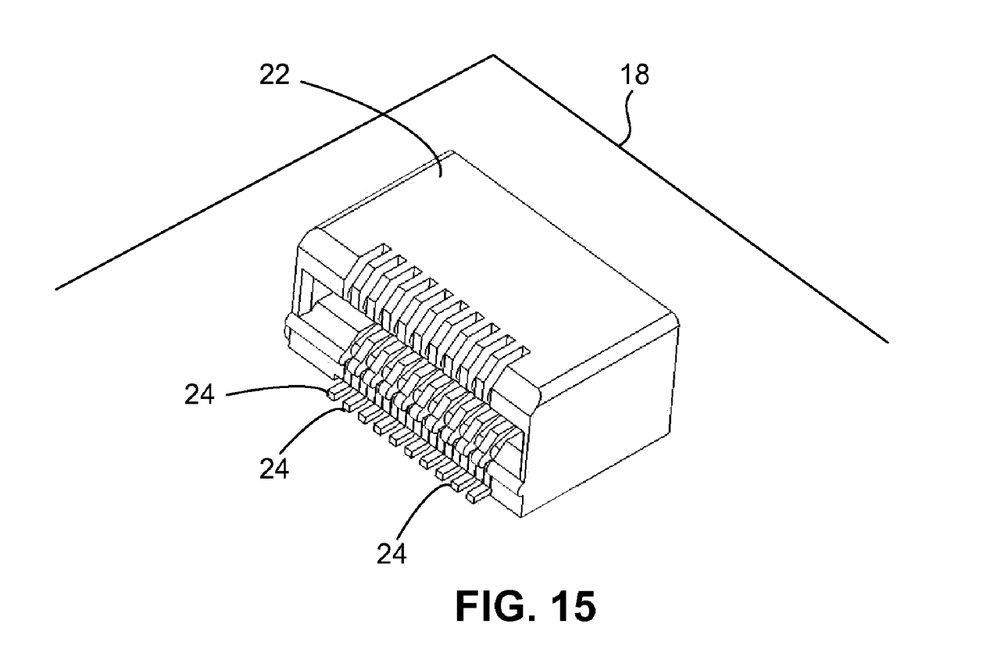
FIG. 15 is a perspective view of the socket of the opto-electronic module connector of FIG. 1 mounted on a system printed circuit board.

As illustrated in FIG. 15, socket assembly 21 comprising socket 22 and EMI-shielding enclosure 14 (not shown for purposes of clarity) can be mounted on system printed circuit board 18 by, for example, soldering electrical leads 24 of socket 22 to pads (not shown for purposes of clarity) on system printed circuit board 18. Socket assembly 21 can be mounted in one of the exemplary orientations or configurations shown in FIGS. 16-19 or other suitable configuration. After socket assembly 21 is mounted on system printed circuit board 18, connector assembly 12 can be inserted into socket assembly 21 in the manner described above with regard to FIGS. 3-6. Connector assembly 12 can be removed from socket assembly 21 for cleaning, maintenance, repair, etc., by grasping and pulling it out of EMI-shielding enclosure 14 in the reverse manner of that shown in FIGS. 3-6.

Figure 16:
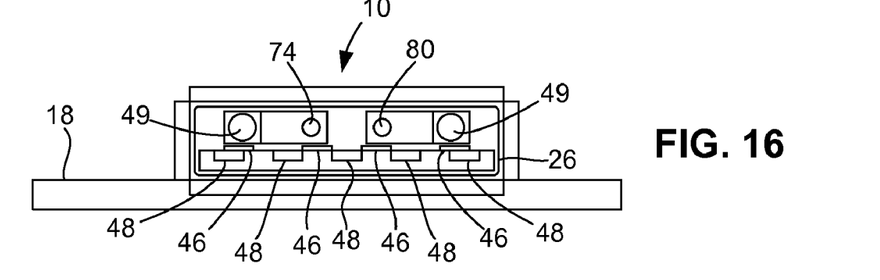
FIG. 16 is a front elevation view of the opto-electronic module connector of FIG. 1, showing it mounted on the system printed circuit board in a first orientation.
Figure 17:
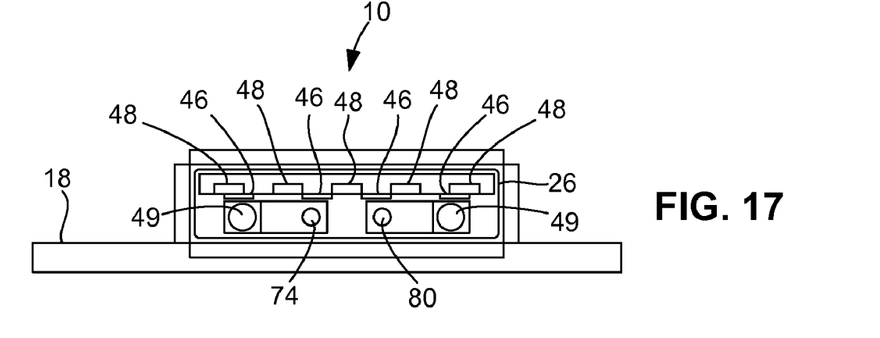
FIG. 17 is similar to FIG. 16, showing the opto-electronic module connector mounted in a second orientation.

In an exemplary mounting configuration, illustrated in FIG. 16, opto-electronic module connector system 10 can be mounted in an orientation in which the one of its sides that is adjacent the top surface of system printed circuit board 18 is the side closest to electrical contact fingers 46 and 48 and their contact holder 28 and farthest from lenses 74 and 80 and alignment protuberances 49. In another exemplary mounting configuration, illustrated in FIG. 17, opto-electronic module connector system 10 is mounted in an orientation in which the one of its sides that is adjacent the top surface of system printed circuit board 18 is the side closest to lenses 74 and 80 and alignment protuberances 49 and farthest from electrical contact fingers 46 and 48 and their contact holder 28. Stated another way, the orientation of opto-electronic module connector system 10 in FIG. 16 is flipped in relation to the orientation of opto-electronic module connector system 10 in FIG. 17.

Figure 18:
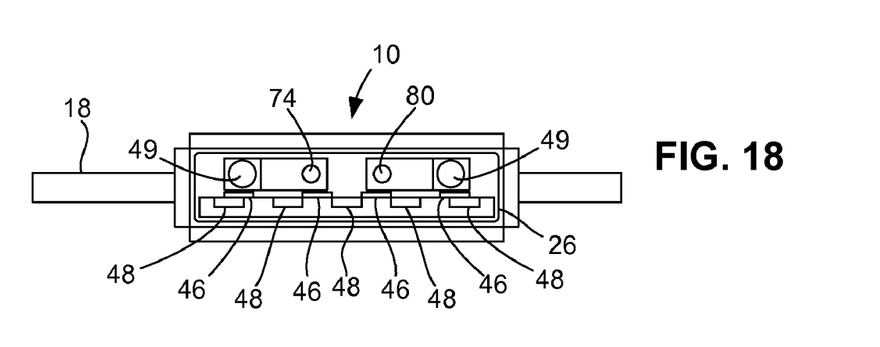
FIG. 18 is similar to FIGS. 16-17, showing the opto-electronic module connector mounted in a third orientation.

In still another exemplary mounting configuration, illustrated in FIG. 18, opto-electronic module connector system 10 is mounted in a slot (not separately shown) through system printed circuit board 18. Accordingly, a portion of opto-electronic module connector system 10 protrudes above the top surface of system printed circuit board 30, and the remainder of opto-electronic module connector system 10 protrudes below the bottom surface of system printed circuit board 30.

Figure 19:
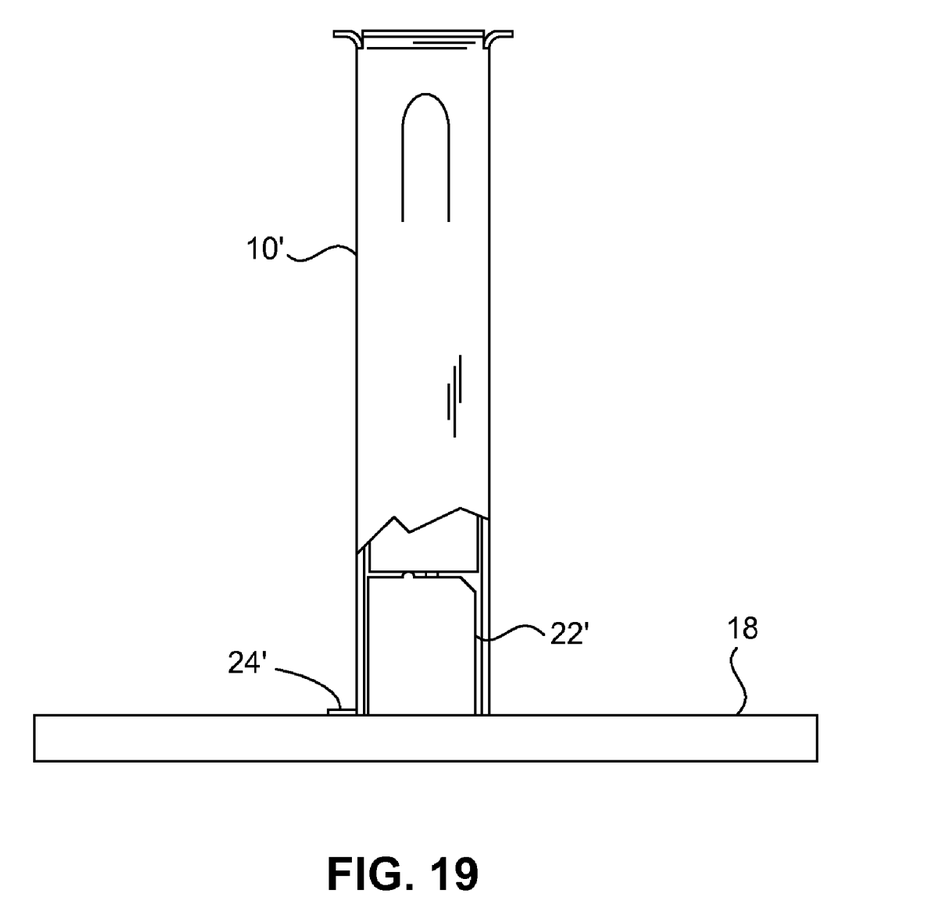
FIG. 19 is similar to FIGS. 16-18, showing the opto-electronic module connector mounted in a fourth orientation, with the EMI-shielding enclosure partially cut away to show the socket inside the EMI-shielding enclosure.

In yet another exemplary mounting configuration, illustrated in FIG. 19, the end of an opto-electronic module connector system 10' that is opposite its open end is mounted on the top surface of system printed circuit board 30. Accordingly, the elongated sides of opto-electronic module connector system 10' are perpendicular to system printed circuit board 18. Note that the socket 22' (similar to the above-described socket 22) has electrical leads 24' that are accordingly oriented for surface mounting on printed circuit board 30. Except for the orientation of electrical leads 24' in socket 22', opto-electronic module connector system 10' is the same as the above-described opto-electronic module connector system 10.

Figure 20:
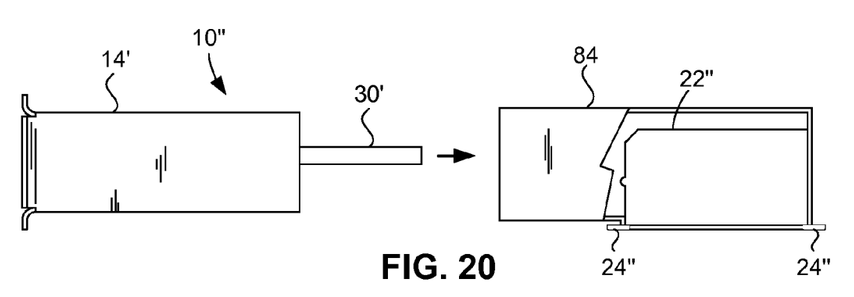
FIG. 20 is a perspective view of an opto-electronic module connector system, showing a shielded connector assembly mating with a shielded socket, in accordance with another exemplary embodiment of the invention.
Figure 21:
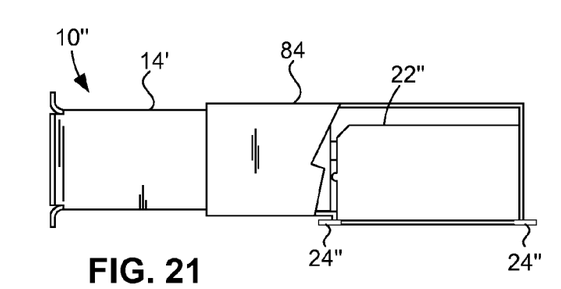
FIG. 21 is similar to FIG. 20, showing the shielded connector assembly fully mated with the shielded socket.

As illustrated in FIG. 20, in another embodiment, an opto-electronic module connector 10" is similar to the above-described opto-electronic module connector system 10 except that it has an attached EMI-shielding enclosure 14' rather than comprising the connector assembly 12 that is user-insertable into (and user-removable from) the separate EMI-shielding enclosure 14 in the embodiment described above with regard to FIGS. 3-6. In the embodiment shown in FIG. 20, the proximal end of opto-electronic module connector 10" plugs into a socket 22" (similar to the above-described socket 22) that is enclosed in a second EMI-shielding portion 84. As in the above-described embodiment, the proximal end of opto-electronic module connector 10" comprises the proximal or rearward end of a connector printed circuit board 30' having a second electrical contact array (not shown). The EMI-shielding enclosure 14' mates with the second EMI-shielding portion 84 when the second electrical contact array of opto-electronic module connector 10" is mated with the socket, as shown in FIG. 21. EMI-shielding enclosure 14' and second EMI-shielding portion 84 together, when mated, define a means for shielding the connector printed circuit board, electrical contact fingers, opto-electronic module, and other elements against EMI. Socket 22" has electrical leads 24" that are similar to electrical leads 24.

When one of the above-described exemplary opto-electronic module connector systems or a similar opto-electronic module connector system is mounted on system printed circuit board in any of the above-described configurations or other such configuration, a user can readily remove and replace the connector assembly for cleaning, maintenance, repair or other purposes without removing the EMI-shielding enclosure or the socket from the system printed circuit board.

Furthermore, as the connector assembly need not be plugged into the socket until after the socket has been mounted on the system printed circuit board, reflow soldering or other manufacturing steps performed upon the EMI-shielding enclosure or socket pose no risk of harm to the connector assembly.

One or more illustrative embodiments of the invention have been described above. However, it is to be understood that the invention is defined by the appended claims and is not limited to the specific embodiments described.

What is claimed is:

1. A method for using an opto-electronic module connector system, the opto-electronic module connector system comprising a socket, an elongated substantially rectangular electromagnetic interference (EMI)-shielding enclosure, and an opto-electronic module connector assembly, the opto-electronic module connector assembly comprising a connector body, a contact holder attached to the connector body, a plurality of electrical contact fingers mounted on the contact holder, and an opto-electronic module, the opto-electronic module comprising a connector printed circuit board and at least one opto-electronic device electrically coupled to one or more circuit path of the connector printed circuit board, the connector printed circuit board having a first electrical contact array comprising a plurality of first electrical contact pads and a second electrical contact array comprising a plurality of second electrical contact pads on a proximal end of the connector printed circuit board, the method comprising:
    mounting the socket and the EMI-shielding enclosure on a system printed circuit board, the EMI-shielding enclosure having a substantially rectangular shape and enclosing the socket;
    inserting a portion of the opto-electronic module connector assembly into an opening at a first end of the EMI-shielding enclosure, the opening bounded by four elongated sides of the EMI-shielding enclosure; and
    plugging the proximal end of the printed circuit board into the socket to electrically mate the second electrical contact array with electrical contacts of the socket.

2. The method claimed in claim 1, further comprising unplugging the proximal end of the printed circuit board from the socket and withdrawing the opto-electronic module connector assembly from the EMI-shielding enclosure.

3. The method claimed in claim 1, wherein mounting the socket and the EMI-shielding enclosure on the system printed circuit board comprises mounting the EMI-shielding enclosure in an orientation wherein one of the four elongated sides of the EMI-shielding enclosure abuts a surface of the printed circuit board, and the opening is at an edge of the system printed circuit board.

4. The method claimed in claim 1, wherein mounting the socket and the EMI-shielding enclosure on the system printed circuit board comprises mounting the EMI-shielding enclosure in a slot in the system printed circuit board, wherein a first portion of the EMI-shielding enclosure protrudes above a top of the system printed circuit board and another portion of the EMI-shielding enclosure protrudes below the bottom of the system printed circuit board, and the opening is at an edge of the system printed circuit board.

5. The method claimed in claim 1, wherein mounting the socket and the EMI-shielding enclosure on the substrate comprises mounting the EMI-shielding enclosure in an orientation wherein a second end of the EMI-shielding enclosure abuts a surface of the system printed circuit board, and the four elongated sides of the EMI-shielding enclosure extend perpendicularly to a surface of the system printed circuit board.

6. An opto-electronic module connector system, comprising:
    a connector body defining a portion of a connector interface pluggably connectable with a mating connector;
    an EMI-shielding enclosure;
    a connector printed circuit board attached to the connector body, the connector printed circuit board having a plurality of circuit paths, a first electrical contact array comprising a plurality of first electrical contact pads, and a second electrical contact array comprising a plurality of second electrical contact pads on a proximal end of the connector printed circuit board;
    at least one opto-electronic device electrically coupled to one or more of the circuit paths of the connector printed circuit board;
    an optical interface optically coupling the opto-electronic module with the connector interface, wherein the connector printed circuit board, the at least one opto-electronic device, and the optical interface in combination define an opto-electronic module;
    a contact holder attached to the connector body; and
    a plurality of electrical contact fingers mounted on the contact holder, proximal ends of the plurality of electrical contact fingers contacting the first electrical contact pads of the connector printed circuit board, wherein a connector assembly defined by the connector body, the connector printed circuit board, and the contact holder has an elongated shape, the second electrical contact pads disposed at a proximal end of the connector assembly, and distal ends of the plurality of the electrical contact fingers disposed at a distal end of the connector assembly and mateable with the mating connector at the connector interface.

7. The opto-electronic module connector system claimed in claim 6, further comprising a socket mateable with the second electrical contact array by the proximal end of the connector printed circuit board plugging into the socket and providing electrical contact between electrical contacts of the socket and the second electrical contact array.

8. The opto-electronic module connector system claimed in claim 7, wherein the EMI-shielding enclosure encloses the socket, and the connector body is unshielded when the connector printed circuit board is not plugged into the socket.

9. The opto-electronic module connector system claimed in claim 8, wherein the EMI-shielding enclosure comprises:
    a first shield portion enclosing a portion of the connector body when the connector printed circuit board is not plugged into the socket; and
    a second shield portion mateable with the first shield portion and enclosing the socket, wherein the first shield portion mates with the second shield portion when the connector printed circuit board is plugged into the socket.

10. The opto-electronic module connector system claimed in claim 8, wherein the EMI-shielding enclosure has a rectangular shape, an opening at a first end, and four elongated sides.

11. The opto-electronic module connector system claimed in claim 6, wherein the plurality of electrical contact fingers are arranged in a Universal Serial Bus (USB)-like configuration.

12. The opto-electronic module connector system claimed in claim 6, wherein:
    the connector printed circuit board includes a first snap engagement connectable to the connector body; and
    the contact holder includes a second snap engagement connectable to the connector body;

wherein the connector body, the connector printed circuit board and the contact holder snap together to define the connector assembly.

13. The opto-electronic module connector system claimed in claim 6, wherein the opto-electronic module comprises the at least one opto-electronic device mounted on the connector printed circuit board and an optical reflector, the opto-electronic device having an optical axis normal to the connector printed circuit board, the optical reflector redirecting an optical signal at a 90-degree angle between the optical axis of the opto-electronic device and the connector interface.

14. The opto-electronic module connector system claimed in claim 13, wherein the at least one opto-electronic device comprises an opto-electronic light source and an opto-electronic light receiver.

15. The opto-electronic module connector system claimed in claim 14, wherein the opto-electronic module further comprises:
- an optical reflector, the optical reflector redirecting an optical signal emitted by the opto-electronic light source at a 90-degree angle between an optical axis of the opto-electronic light source and the connector interface, wherein the optical axis of the opto-electronic light source is normal to the connector printed circuit board; and
- a first lens disposed between the opto-electronic light source and the optical reflector; and
- a second lens disposed between the optical reflector and the connector interface, wherein the first lens and second lens in combination define a collimating lens structure.

16. An opto-electronic module connector system kit, comprising:
- a first connector kit portion, comprising:
  - a socket having a plurality of electrical contacts; and
  - an EMI-shielding enclosure first shield portion shielding at least a portion of the socket; and
- a second connector kit portion, comprising:
  - a connector body defining a portion of a connector interface pluggably connectable with a mating connector;
  - a contact holder attached to the connector body; and
  - a plurality of electrical contact fingers mounted on the contact holder; and
- an opto-electronic module, comprising:
  - a connector printed circuit board connected to the contact holder, the connector printed circuit board having a plurality of circuit paths, a first electrical contact array comprising a plurality of first electrical contact pads, and a second electrical contact array comprising a plurality of second electrical contact pads on a proximal end of the connector printed circuit board, proximal ends of the plurality of electrical contact fingers contacting the first electrical contact pads of the connector printed circuit board, wherein a connector assembly defined by the connector body, the connector printed circuit board, and the contact holder has an elongated shape, the second electrical contact pads are disposed at a proximal end of the connector assembly, and distal ends of the plurality of the electrical contact fingers are disposed at a distal end of the connector assembly and mateable with the mating connector at the connector interface, the second electrical contact array mateable with the socket by the proximal end of the connector printed circuit board plugging into the socket;
  - at least one opto-electronic device electrically coupled to one or more of the circuit paths of the connector printed circuit board; and
  - an optical interface optically coupling the at least one opto-electronic device with the connector interface.

17. The opto-electronic module connector system kit claimed in claim 16, wherein the plurality of electrical contact fingers are arranged in a Universal Serial Bus (USB)-like configuration.

18. The opto-electronic module connector system kit claimed in claim 16, wherein the at least one opto-electronic device comprises an opto-electronic light source and an opto-electronic light receiver mounted on the connector printed circuit board, and the optical interface comprises:
- an optical reflector, the optical reflector redirecting an optical signal emitted by the opto-electronic light source at a 90-degree angle between an optical axis of the opto-electronic light source and the connector interface, wherein the optical axis of the opto-electronic light source is normal to the connector printed circuit board; and
- a first lens disposed between the opto-electronic light source and the optical reflector; and
- a second lens disposed between the optical reflector and the connector interface, wherein the first lens and second lens in combination define a collimating lens structure.

19. The opto-electronic module connector system kit claimed in claim 16, wherein the EMI-shielding enclosure first shield portion shields the socket when the connector printed circuit board is not plugged into the socket, and the connector body is unshielded when the connector printed circuit board is not plugged into the socket.

20. The opto-electronic module connector system kit claimed in claim 16, wherein the second connector kit portion further comprises an EMI-shielding enclosure second shield portion enclosing a portion of the connector body when the connector printed circuit board is not plugged into the socket, and wherein the EMI-shielding enclosure second shield portion mates with the EMI-shielding enclosure first shield portion when the connector printed circuit board is plugged into the socket.

* * * * *